United States Patent [19]

Naito et al.

[11] Patent Number: 5,107,394
[45] Date of Patent: Apr. 21, 1992

[54] CERAMIC ELECTRONIC PART AND PRODUCING METHOD THEREOF

[75] Inventors: Yasuyuki Naito; Shinichi Okubo; Hiroji Tani; Kanehito Honma; Tadashi Morimoto; Harufumi Mandai, all of Nagaokakyo, Japan

[73] Assignee: Murata Manufacturing Co., Ltd., Japan

[21] Appl. No.: 675,149

[22] Filed: Mar. 26, 1991

[30] Foreign Application Priority Data

Mar. 26, 1990 [JP] Japan .................................. 2-77191

[51] Int. Cl.⁵ ...................... H01G 1/14; H01G 4/10; H01G 7/00
[52] U.S. Cl. .................................. 361/309; 361/321; 29/25.42
[58] Field of Search ............... 361/320, 321, 303, 306, 361/308, 309, 310; 29/25.42

[56] References Cited

U.S. PATENT DOCUMENTS

| | | | |
|---|---|---|---|
| 4,107,759 | 8/1978 | Shirn et al. | 361/321 |
| 4,604,676 | 8/1986 | Senda et al. | 361/309 |
| 4,607,316 | 8/1986 | Wada et al. | 361/321 |
| 4,935,843 | 6/1990 | McLaughlin et al. | 361/321 |
| 4,982,485 | 1/1991 | Nakaya et al. | 29/25.42 |

Primary Examiner—Donald A. Griffin
Attorney, Agent, or Firm—Ostrolenk, Faber, Gerb & Soffen

[57] ABSTRACT

An external electrode is formed on an outer surface of a ceramic molded product. The external e.ectrode consists of an inner layer and an outer layer. The inner layer is composed of conductive material. The outer layer is composed of conductive material and glass material. In a process for producing the ceramic molded product, first, by molding a ceramic material a molded product is formed. On outer surfaces of the molded product, a conductive paste containing copper or the like is coated. Furthermore, on the conductive paste, a conductive paste containing a glass frit is coated. By baking the molded product onto which these two kinds of conductive paste are coated, ceramic electronic parts having an external electrode of 2-layer structure is obtained.

14 Claims, 1 Drawing Sheet

CERAMIC ELECTRONIC PART AND PRODUCING METHOD THEREOF

BACKGROUND OF THE INVENTION

1. Field of the Invention

The present invention relates to a ceramic electronic part and producing method thereof, and particularly, to a ceramic electronic part having an external electrode on the outer face of a ceramic chip such as a laminated capacitor, a chip coil or a resistor, and to a method for producing of the ceramic electronic part.

2. Description of the Prior Art

A laminated capacitor which is an example of a conventional ceramic electronic part, is the laminated capacitor having external electrodes on an outer surface of a ceramic molded product which has a plurality of internal electrodes, wherein the external electrodes are connected to the internal electrodes. When manufacturing the laminated capacitor, first, a plurality of ceramic green sheets onto which a conductive paste for serving as an internal electrode is printed, are laminated, pressed and cut into any size to form a laminate. The laminate is baked into a ceramic chip, which is coated with a conductive paste on outer surfaces thereof and baked to form an external electrode.

In this case, in order to improve the solderability and soldering heat resistance of the external electrode, the ratio of silver, palladium etc. in the conductive paste and the addition of glass frit are controlled.

As a method of forming the external electrode, a thin-film forming process such as sputtering or an electrolytic plating process is used to form the external electrode with a multi-layer structure such as nickel, tin and solder.

A method of forming the external electrode simultaneously with sintering the laminate onto which a conductive paste containing the glass frit is coated is disclosed in Japanese Patent Publication No. 40842/1987.

In the method of forming the baked external electrode on the ceramic chips the ceramic chips must be aligned when coating the conductive paste or when masking at in the sputtering process. However, the ceramic chips are so small that they are difficult to align.

An additional problem is that sintering of the laminate may cause deformation of the ceramic chips such as a bend or a warp. Therefore, some of the ceramic chips can not be handled with a machine for automated forming of the external electrode, which results in a low yield and causes difficulty in reducing the cost at mass production.

Moreover, in the method of forming the external electrode on the ceramic chip by electrolytic plating, the weatherability is deteriorated by a plating liquid permeated into the ceramic chip, spoiling reliability of the parts.

In the electronic parts having the external electrode formed on the outer surface of the ceramic chip by these methods, for example, when external circuits are to be soldered, the external electrode may elute into the solder to cause poor heat resistance.

In the method disclosed in Japanese Patent Publication No. 40842/1987, the bonding strength between the ceramic chip and the external electrode is strengthened by the glass frit, whereby the elution of the external electrode into the solder is prevented. However, when the laminate is baked, the glass frit diffuses into the laminate to produce stresses inside the ceramics, so that a bend, warp or crack is produced, which results in poor productivity.

SUMMARY OF THE INVENTION

It is, therefore, a primary object of the present invention to provide a ceramic electronic part having a structure such that the external electrode hardly elutes into the solder.

It is another object of the present invention to provide a method for producing ceramic electronic parts with high productivity, which is capable of obtaining ceramic electronic parts having good weatherability and an external electrode which hardly elutes into the solder.

The present invention is directed to a ceramic electronic part including a ceramic molded product and an external electrode formed on a outer surface of the ceramic molded product, wherein the external electrode includes an inner layer composed of conductive material and formed on a surface of the ceramic molded product, and an outer layer composed of conductive material and glass material and formed on the inner layer.

The method of the present invention is directed to a method of producing ceramic electronic parts comprising, a process of molding a green ceramic material to form a molded product, a process of coating a conductive paste on outer surfaces of the molded product, a process of coating a conductive paste containing a glass frit on the surface of the conductive paste, and a process of baking the molded product onto which the conductive paste and the conductive paste containing the glass frit are coated, to form an external electrode on outer surfaces of the ceramic molded product which is formed by baking the molded product.

Inner layer portions of the external electrode prevent diffusion of the glass frit into the molded product during the baking.

Outer layer portions of the external electrode include a glass material because of adding the glass frit to the conductive paste. The glass material prevents elution of the electrode into the solder.

According to the method of the invention, the glass frit does not diffuse into the molded product during the baking and deformation and cracks hardly occur in the ceramic chips. Also, since it is not necessary to form the external electrode after the ceramic chips, are baked production of the electronic parts can be simply automatized.

Furthermore, in the ceramic electronic part of the present invention, since the external electrode rarely elutes into the solder during the soldering, the soldering heat resistance can be improved.

The above and other objects, features, aspects and advantages of the present invention will become more apparent from the following detailed description of the embodiment made in connection with the accompanying drawings.

DESCRIPTION OF THE PREFERRED EMBODIMENTS

Figure 1:
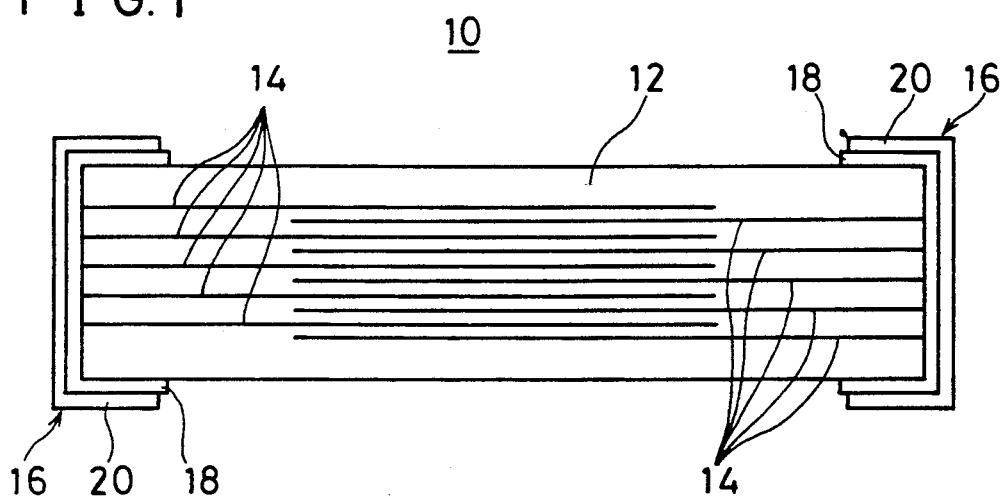
FIG. 1 is an illustrative view showing a laminated capacitor which is an example of the present invention.

FIG. 1 is an illustrative view showing a laminated capacitor which is an example of the ceramic electronic part of the invention. The laminated capacitor 10 includes a ceramic molded product 12. The ceramic molded product 12 is composed of a ceramic material having a high dielectric constant. A plurality of internal electrodes are formed in the ceramic molded product 12. As the material of the internal electrodes 14, for example, copper is used. The internal electrodes 14 are so arranged to parallel each other. A plurality of the internal electrodes 14 are drawn out to the opposite side faces by turns.

External electrodes 16 are formed on the opposite side faces of the ceramic molded product 12. The external electrode 16 consists of an inner layer 18 and an outer layer 20. The inner layer 18 of the external electrode 16 is formed on the surface of the ceramic molded product 12, and connected to the internal electrodes 14. The inner layer 18 is composed of a conductive material such as copper or the like. The outer layer 20 of the external electrode 18 is formed on the inner layer 18. The outer layer 20 is composed of a conductive material such as a copper or the like and a glass material.

For producing the laminated capacitor, first, a ceramic material composed of Ba-Si-Zr was prepared. In addition, as electrode materials, a first conductive paste consisting mainly of copper and a second conductive paste consisting of copper and a glass frit were prepared.

Figure 2:
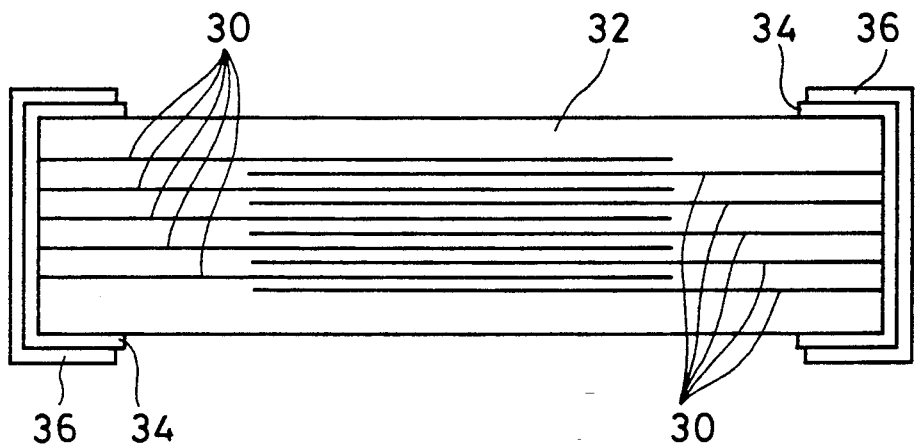
FIG. 2 is an illustrative view showing a process of producing a laminated capacitor with the method of the present invention.

Next, a green sheet was formed by using the ceramic material, and the first conductive paste was coated on a surface of the green sheet to form an internal electrode. A plurality of green sheets onto which the first conductive paste is coated were laminated and pressed to obtain a laminate 32 having plural internal electrode materials 30 as shown in FIG. 2.

On opposing end faces of the laminate 32, the aforesaid first conductive paste was coated by, for example, a dipping process so as to be connected to the internal electrode materials 30 to obtain inner layer materials 34 to form part of an external electrode. Then, on the surface of the inner layer materials 34 of the external electrode, the second conductive paste was coated by, for example, a dipping process to obtain outer layer materials 36 to form the rest of the external electrode.

The laminate 32 onto which the respective electrode materials are coated was baked in $N_2$-$H_2$ atmosphere for two hours at 1000° C. The ceramic material and each electrode material are sintered by baking the laminate 32, and a laminated capacitor shown in FIG. 1 is obtained.

A laminated capacitor using a material containing 0.1% of glass frit by weight against copper as the second conductive paste material was designated as an example 1 a laminated capacitor using a material containing 1% of glass frit by weight against copper was designated as an example 2, and a laminated capacitor using a material containing 3% of glass frit by weight against copper was designated as an example 3.

As a comparative example 1, a laminated capacitor was formed with an external electrode produced by coating only the first conductive paste on opposite end faces of the laminate and baking.

As a comparative example 2, a laminated capacitor was formed with an external electrode produced by coating only the conductive paste containing copper and 1% of glass frit by weight against the copper on opposite end faces of the laminate and baking.

As a comparative example 3, a laminated capacitor formed with an external electrode of 2-layer structure was produce by coating the first conductive paste on opposite end faces of the laminate, and further, coating a conductive paste containing copper and 0.05% of glass frit by weight against the copper on the first conductive paste and baking.

As a comparative example 4, a laminated capacitor formed with an external electrode of 2-layer structure was produced by coating the first conductive paste on opposite end faces of the laminate, and further, coating a conductive paste containing copper and 5% of glass frit by weight against the copper on the first conductive paste and baking.

For these laminated capacitors, solderability, soldering heat resistance and conditions of the ceramic chip were checked and are shown in a separate table.

As it is understood from the table, by forming the external electrode into a 2-layer structure and using the material containing copper and glass frit as the outer layer material, the laminated capacitor having a good solderability, soldering heat resistance and chip condition can be obtained.

As the amount of glass frit, 0.1 to 3% by weight against copper is desirable. In case the glass frit is not contained as in the comparative example 1, or the amount of glass frit is less than 0.1% by weight against copper as in the comparative example 3, elution of the external electrode is observed during the soldering. In case the amount of glass frit is more than 3% by weight against copper as in the comparative example 4, the solderability is more or less poor and cracks are produced in the ceramic chip.

Also, in case only the material containing the copper and glass frit is used as the external electrode as in the comparative example 2, the glass frit would diffuse into the ceramic chip to cause cracks.

On the contrary, in the laminated capacitor of the present invention, the glass material is formed in the outer layer of the external electrode by baking, and elution of the external electrode hardly occurs during the soldering. When the method of the present invention is used, electronic parts can be obtained in which the occurrence of cracks is lessened and the elution of external electrode hardly occurs during soldering. Moreover, no plating liquid diffuses into the ceramic chip as in the electrolytic plating process, thus electronic parts with little deterioration in weatherability can be obtained. Also, since the conductive paste which does not contain the glass frit is used as the inner layer material of the external electrode, resistance between the internal electrode and the external electrode can be reduced.

Figure 3:
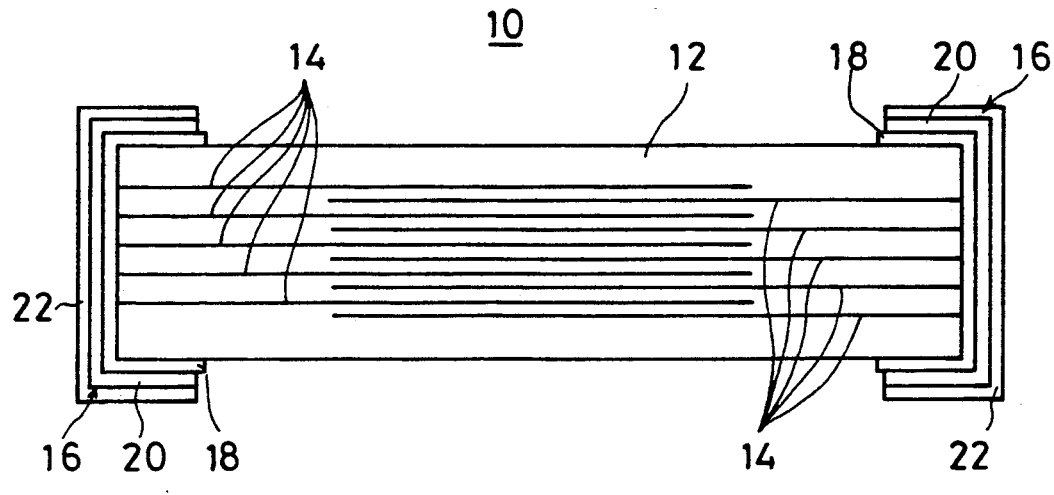
FIG. 3 is an illustrative view showing an another example of the laminated capacitor shown in FIG. 1.

As shown in FIG. 3, a cover layer 22 may be formed on the surface of the external electrode by using solder or tin or the like. By forming the laminated capacitor into such structure, solderability between the external electrode and external circuits can be improved further.

In the embodiment mentioned above, though a laminated capacitor and producing method thereof has been described, the present invention may be applied to another ceramic electronic part having an external electrode such as a chip coil, resistor or the like, and to a method of producing the ceramic electronic parts.

While the present invention has been particularly described and shown, it is to be understood that such description is used as an illustration and example rather than as a limitation, and the spirit and scope of the present invention is determined solely by the terms of the appended claims.

TABLE

|  | Solderability | Soldering Heat | Chip Condition |
|---|---|---|---|
| Example 1 | good | good | good |
| Example 2 | good | good | good |
| Example 3 | good | good | good |
| Comparative Example 1 | good | elution of copper | good |
| Comparative Example 2 | good | good | cracks |
| Comparative Example 3 | good | elution of copper | good |
| Comparative Example 4 | fair | good | cracks |

What is claimed is:

1. A ceramic electronic part including,
   a ceramic molded product, and
   an external electrode formed on an outer surface of said ceramic molded product, wherein
   said external electrode includes,
      an inner layer composed of conductive material and formed on a surface of said ceramic molded product, and
      an outer layer composed of conductive material and glass material, and formed on said inner layer.

2. A ceramic electronic part in accordance with claim 1, wherein
   at least about 0.1% and not more than about 3% by weight of said glass material is contained in said outer layer.

3. A ceramic electronic part in accordance with claim 2, further comprising,
   a cover layer formed on said external electrode made of solder or tin.

4. A ceramic electronic part in accordance with claim 1, wherein said conductive material includes copper.

5. A ceramic electronic part in accordance with claim 4, wherein said glass material includes glass frit.

6. A ceramic electronic part in accordance with claim 5, wherein said ceramic molded product comprises ceramic material having a high dielectric constant.

7. A ceramic electronic part in accordance with claim 6, wherein said ceramic material is a Ba-Si-Zr-system ceramic material.

8. A method of producing a ceramic electronic part comprising the steps of:
   molding a green ceramic material to form a molded product;
   coating a first conductive paste on outer surfaces of said molded product;
   coating a second conductive paste containing a glass frit on the surface of said first conductive paste; and
   baking said molded product onto which said first conductive paste and said second conductive paste containing the glass frit are coated, to form an external electrode on an outer surface of a ceramic molded final product which is formed by baking said molded product.

9. A method in accordance with claim 8 wherein said second conductive paste including the glass frit is constituted by a metal material and the glass frit.

10. A method in accordance with claim 9, wherein at least about 0.1% and not more than about 3% by weight of said glass frit is contained in said second conductive paste.

11. A method in accordance with claim 6, wherein said metal material is copper.

12. A method in accordance of claim 11, further comprising,
   a step of covering the surface of said external electrode with solder or tin.

13. A method in accordance with claim 11, wherein said ceramic molded product comprises ceramic material having a high dielectric constant.

14. A method in accordance with claim 13, wherein said ceramic material is a Ba-Si-Zr-system ceramic material.

* * * * *